Figure 1:
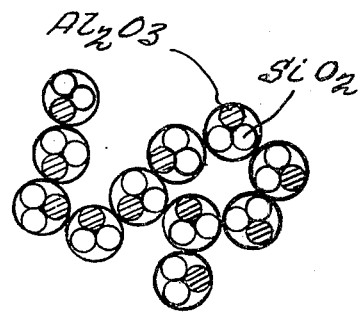

United States Patent [19]

Knorre et al.

[11] 3,980,593

[45] Sept. 14, 1976

[54] ANTICAKING AGENT FOR INORGANIC SALTS

[75] Inventors: Helmut Knorre, Seligenstadt; Joachim Fischer, Hanau, both of Germany

[73] Assignee: Deutsche Gold- und Silber-Scheideanstalt vormals Roessler, Frankfurt, Germany

[22] Filed: Apr. 30, 1975

[21] Appl. No.: 573,335

[30] Foreign Application Priority Data

Nov. 29, 1974  Germany............................ 2456433

[52] U.S. Cl................................. 252/383; 252/384; 252/385
[51] Int. Cl.²........................................... A23L 1/00
[58] Field of Search ............ 252/382, 383, 384, 385

[56] References Cited
UNITED STATES PATENTS 3,382,175   5/1968   Jacoby et al..................... 252/383 X
3,396,113   8/1968   Jacoby et al..................... 252/383 X Primary Examiner—Stephen J. Lechert, Jr.
Attorney, Agent, or Firm—Cushman, Darby & Cushman

[57] ABSTRACT

There is prepared a powdery anticaking agent for inorganic salts based on (A) an iron cyanide complex, (B) a water insoluble inorganic, inert, finely divided hydroxyl group containing material or a material able to form this in the production of the anticaking agent, (C) hydrophobizing and/or (D) hydrophilizing materials in which (A), (C) and/or (D) are employed on component (B) as a carrier together with (E) water in an amount of 20 to 50 weight percent, preferable 35 to 45 weight percent. The composition is prepared by intensively mixing the carrier (B) in the corresponding ratio in the dry state with the active materials at room temperature and then adding to this mixture so much water that the active components go into solution and as such are absorbed on the carrier and regulating the pH to 7 to 9, preferably 7 to 8.

28 Claims, 4 Drawing Figures

ANTICAKING AGENT FOR INORGANIC SALTS

The invention concerns an anticaking agent for inorganic salts as well as a process for the production of the anticaking agent which is especially suited for the prevention of caking together and for preserving the flowability of salts, specifically alkali chlorides, e.g. sodium chloride or potassium chloride, and alkali chloride containing salt mixtures.

Economization and automization of industrial processes in an increasing measure require that the materials used thereby do not cake together flow freely and be easily dosing. However, it is known that many inorganic salts in the form of finely divided crystallizates or granulates harden after a relatively short time in storage or also during transportation. This makes for considerable difficulty in the handling of the product. Already in emptying the silo in the production works there is increased operation expense and danger points on account of this tendency to harden designated generally as caking together. The salt must be disintegrated from the outside by a mechanical auxiliary apparatus and be brought into motion in order to be emptied or loaded. In removing of the salt mountain with a dredger because of the hardening there frequently remain standing steep walls which reach to the peaks of the salt mountain and suddenly collapse and can fill up the dredger. Also in using the salt the dosing or mixing together with other substances is injured to a considerable extent by the caking together. Therefore there have not lacked attempts to find ways and means to reduce or entirely eliminate this tendency of salts to harden.

On of the best known processes consists of mixing in the dry form with salts having a tendency to harden, finely divided fillers, as for example silica, alkali, alkaline earth and aluminum silicates, aluminum oxide, magnesium oxide calcium oxide or alkaline earth carbonate. These additives form a loose jacket around the individual salt crystals or granulates which in the recrystallization of the salt prevent a formation of bridges between the individual particles and therewith the caking together. The disadvantages of these frequently water insoluble additives are that they must be used in relatively large amounts in order to produce a suitable effect. Through these high additives the products are included to be powdery and also lose most of their clear solubility in water. Besides for mixing the additives with the anticake resistant finished salt there is required very effective mixing apparatuses which as a rule are very expensive.

Frequently the hydrophobizing action of organic substances such as oils, glycerine, paraffins, paraffin oils, alkyl sulfonates or fatty amines is also sufficient for the anticaking finishing of salts. These additives for the most part have the disadvantage that they can only be placed on the salt with great industrial expense, for examples as melts. A dosing of the hot salt, as it comes out of the production, by means of coco-fatty amines is practically impossible because of the odor troubles and danger to health associated therewith. It must be undertaken in a separate working step before the loading of the cold salt. In the interim storage of the salt therefore there is no protection before the caking together.

Besides it has long been known that the hardening of alkali chlorides can be reduced by an addition of complex iron cyanides. These products are also added in combination with agents for improving the freezing behavior of the salt. If the alkali chlorides are contaminated with other materials, above all alkaline earth compound, frequently the anticaking finishing with complex iron cyanides fails to work. Also additives which cause a precipitation or masking of the alkaline with ions, in many cases bring about no improvement of the anticaking properties of the salts by addition of complex iron cyanides.

The invention is based on the problem of making an anti-caking agent for inorganic salts based on (A) an iron cyanide complex, (B) a water insoluble, inorganic, inert, finely divided hydroxyl group containing material or a material able to form this in the production of the anticaking agent, (C) hydrophobizing acting materials and/or (D) hydrophilizing materials which is universally usable and does not have the above named disadvantages but rather makes possible an optimum anticaking effect without especial industrial expense.

The characteristics of the invention comprise placing the components (A) (C) and/or (D) in the form of a powdery mixture on component (B) as a carrier together with (E) water. The latter is used in an amount of 20 to 50 weight percent, preferably 35 to 45 weight percent of water.

Each of the constituents of the anticaking agent of the invention has its own special role. However, only in the interplay of all components is the desired anticaking effect produced. The caking of the salt is known to depend upon the fact that on account of moisture absorption and evolution under changing climate conditions on the surface of the salt particles a recrystallization occurs in which the salt particles cake together. If the recrystallization is prevented the salt also does not cake the salt together.

For the addition of hydrophilizing (D) and hydrophobizing (C) materials to easily caking inorganic salts, the water contents of the salt is regulated in such a way that there always remains a fixed uniform residual moisture. If a recrystallization of the salt should occur under extreme conditions, the addition of the complex iron cyanide (A) insures that the crystallizing salt forms no solid bridges but only loose dendritic compounds. For these components to be effective it is necessary that they be distributed homogeneously on the surface of the salt particles by simple means and without great industrial expense. This is obtained by the invention by adding the materials not directly but on the carrier (B). This carrier (B) is a water insoluble highly dispersed compound which permits itself to be well distributed in the salt and also remains held on the surface of the salt crystals under extreme conditions of moisture. Because of its hydroxyl groups it likewise contributes to regulating the moisture content of the salt. On the other hand it causes the complex iron cyanide to be localized at exactly the place and to remain held where the danger of growing together of the salt crystals is the greatest.

As complex iron cyanides there can be employed all commercial hexacyano ferrates of alkali and alkaline earth metals. Especially approved are sodium ferrocyanide, potassium ferrocyanide and calcium ferrocyanide.

As insoluble carriers (B) there are especially suited inorganic finely divided materials with a secondary particle size between 0.1 and 150$\mu$, preferably 0.2 to 20$\mu$, which have hydroxyl groups or are able to form hydroxyl groups in the production of the anticaking agents.

It is especially advantageous to employ finely divided precipitated or pyrogenically obtained metal oxides and/or metalloid oxides, especially $SiO_2$, or $Al_2O_3$ in the form of individual oxides, mixed oxides, oxide mixtures or mixtures of oxides.

Figure 2:
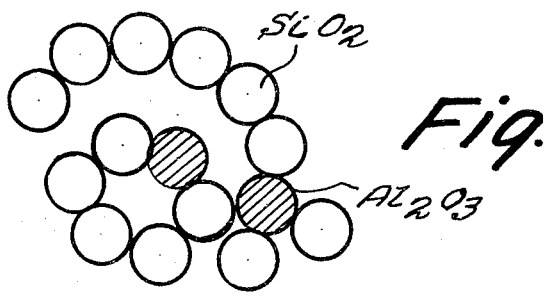
Figure 3:
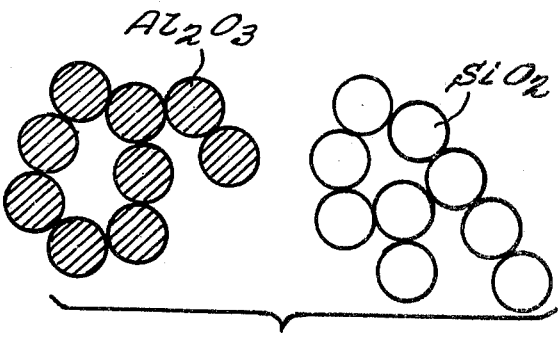
Figure 4:
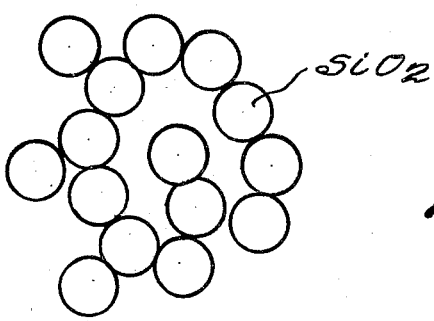

These four types of oxides are described more specifically in the drawings wherein:

FIG. 1 illustrates mixed oxides;
FIG. 2 illustrates oxide mixtures;
FIG. 3 illustrates mixtures of oxides, and
FIG. 4 illustrates individual oxides.

Referring more specifically to the drawings, FIG. 1 shows mixed oxides of $Al_2O_3$ in $SiO_2$. There is a building of foreign oxides into the primary particles. There are flocks of a so-called mixed oxide, for example $Al_2O_3$ in $SiO_2$. By agitating the particles in water there are formed stable sols in aqueous dispersion. The mixed oxides can be prepared according to Wagner Canadian Pat. No. 573,556 and Wagner U.S. Pat. No. 2,951,044. The mixed oxides are produced from a mixture of two volatile metal or metalloid halides using combustible gases and oxygen in a flame with water formation (hydrolytic decomposition). The two volatile halides come out of a single burner nozzle with reaction in the nozzle to form the mixed oxides. One production process. The entire disclosures of the Canadian and U.S. Wagner patents are hereby incorporated by reference and relied upon.

FIG. 2 shows oxide mixtures (or co-coagulates) of $SiO_2$ and $Al_2O_3$. There are flocks of separate primary particles, so-called co-coagulates (oxide mixtures), for example $SiO_2/Al_2O_3$. The oxide mixtures (or co-coagulates) can be prepared according to Wagner German Pat. No. 1,066,552, Wagner U.S. Pat. No. 3,103,495 or Wagner U.S. Pat. No. 2,951,044, col. 3, lines 33 et seq. Two volatile metal compounds, for example $SiCl_4$ and $AlCl_3$ were reacted from two nozzles in (one or) two flames or flame chambers and jointly coagulated. Two volatile not mixed materials from two nozzles in a flame chamber. One production process. The entire disclosures of the Wagner German patent and both Wagner U.S. patents are hereby incorporated by reference and relied upon.

FIG. 3 shows mixtures of oxides specifically $Al_2O_3$ and $SiO_2$. There are several separate flocks. However, each flock consists of primary particles. Examples are $SiO_2$ and $Al_2O_3$ or $SiO_2$ and $TiO_2$ as thickening agents. The mixture of oxides can be produced according to Marsden U.S. Pat. No. 2,965,568. Thus the oxide mixtures can be formed by mechanical mixing of two or more oxides recovered in separate processes pyrogenically or by precipitation or naturally. There are several methods of production and from these separate mixing processes. The entire disclosure of U.S. Pat. No. 2,965,568 is hereby incorporated by reference and relied upon.

FIG. 4 shows individual particles of an oxide specifically $SiO_2$. They are flocks of unitary primary particles (flocks=secondary particles), for example $SiO_2$ (Aerosil). The oxide is produced according to Bommer German Auslegeschrift No. 1,150,955; Brunner German Auslegeschrift No. 1,163,784 and Brunner German Auslegeschrift No. 1,210,421. The unitary oxide is produced from a volatile metal or metalloid compound with combustible gases and oxygen in a flame with water formation, (hydrolytic decomposition). The entire disclosures of the three German Auslegeschrifts are hereby incorporated by reference and relied upon.

There can be used not only inorganic oxides but also other inorganic compounds such as alkali and/or alkaline earth and/or alumino silicates e.g. sodium silicate, potassium silicate, magnesium silicate, calcium silicate zeolite (a sodium aluminosilicate). These products have a specific BET surface area of about 50–500 m²/g, preferably 180–230 m²/g. Their silanol group density is between 1 and 10 SiOH/100 A², preferably 3–6 Si-OH/100 A². The adsorbed moisture of the product is between 0.5 and 10 weight percent preferably between 3 and 6 weight percent. Carriers of this structure can absorb up to 40 weight percent of moisture without losing the appearance of a dry powder. In this form they are able to hold the active components bound in a kind of solid-dispersion. In order to be able to absorb the active components in this form the portion of the carrier material in the anticaking mixture must be 30–70 weight percent, preferably 40–50 weight percent.

As hydrophobizing active components there can be used above all organosilicon compounds, polywaxes (middle molecular weight 1500 to 5000, melting point – 90° to 105°C, C 100 to C 300), paraffin waxes (middle molecular weight 370 to 460; softening temperature – 50° to 60°C; C24 to C 31) and saturated fatty acids, especially higher fatty acids, e.g. of 12 to 18 carbon atoms, as for example stearic acid, lauric acid and palmitic acid and other long chain fatty acids. As organic silanes, there may be especially mentioned propyltrialkoxy silane, e.g. propyl trimethoxy silane, propyl triethoxy silane and propyltributoxy silane, polypropylsiloxane and poly methylsiloxane. The oxides can also be hydrophobized in the manner shown in Laufer U.S. Pat. No. 3,873,337 the entire disclosure of which is hereby incorporated by reference and relied upon.

As hydrophilizing active components above all compounds of the polycarboxylate type have been found advantageous. Examples of such compounds are polyacrylates, poly(alpha hydroxyacrylates), homo and copolymers of maleic acid (e.g. styrene-maleic acid copolymer) or other unsaturated di and polycarboxylic acid, for example itaconic acid or their corresponding salts, e.g. the sodium and potassium salts such as sodium polyacrylate for example. It is especially advantageous to use such polycarboxylates which contain as functional groups besides predominantly carboxyl or carboxylate groups additionally carboxyl and/or hydroxyl groups. The average degree of polymerization of the polycarboxylate, for short called POC is between 5 and 500, preferably between 10 and 300, especially between 15 and 100. Processes for the production and building of the POC's are fully described in Haschke German Offenlegungsschrift No. 1,904,941, Haschke U.S. Pat. No. 3,686,145 and corresponding Haschke German Offenlegungsschrift No. 1,904,941 and Haschke U.S. Pat. No. 3,793,222 and corresponding Haschke German Offenlegungsschrift No. 1,942,556. The entire disclosures of the two U.S. Haschke patents and Haschke German Offenlegungsschrift No. 1,904,940 are hereby incorporated by reference and relied upon. As further examples of hydrophilizing active components there can also be used polyhydric alcohols such as glycerine or polyethylene glycols, e.g. tetraethylene glycol or polyethylene glycol 400.

A POC of Type A used in the composition of the invention is characterized by the following data:

A poly-(aldehydrocarboxylic acid) solution is prepared by oxidative copolymerization of 20 mol% of acrylic acid with 80 mol% of acrolein in aqueous 20 weight % hydrogen peroxide at 70°C (1.1 mol of acrolein per mol of $H_2O_2$; feeding the monomer mixture to the stirred hydrogen peroxide within 4 hours). This solution was neutralized by adding 40 weight % sodium hydroxide solution at 35°C after distillative separation of the greatest part of the residual monomers and the neutralized mixture subjected to the Cannizzaro reaction by further addition of NaOH up to pH 12. After neutralization of the alkaline reaction mixture with a residue of the above given poly(aldehydrocarboxylic acid) to pH 7 there was obtained a 36 weight % aqueous solution of a poly(hydroxycarboxylate) which is built of the following units of the general formula and is described by the following parameters:

Y+ W/2 base mol percent units of the general formula:

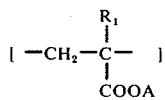  (I)

U-W base mol percent units of the general formula:

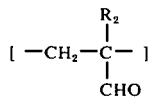  (II)

Z base mol percent units of the general formula:

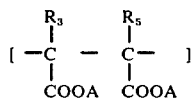  (III)

W/2 base mol percent units of the general formula:

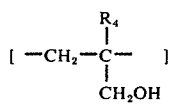  (IV)

and

V base mol percent units of the general formula:

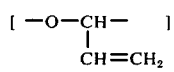  (V)

A stands for an alkali metal, e.g. sodium or potassium, hydrogen or the ammonium ion, $R_1$ stands for hydrogen, methyl, hydroxymethyl, ethyl, chlorine or bromine, preferably hydrogen or hydroxymethyl, $R_2$ and $R_4$ can be the same or different and are hydrogen or hydroxymethyl, $R_3$ and $R_5$ are likewise the same or different and are hydrogen, methyl or ethyl, preferably hydrogen, whereby as boundary conditions there must be fulfilled that W is greater than 0.3U as well as for such polymers which contain an appreciable number of units of general Formula IV, the quotient of the ground mol percent carboxyl or carboxylate groups and ground mol percent of hydroxyl groups between 2 and 16, preferably between 2 and 9 especially between 3 and 8.

In POC, Type A, Y is 70 base mol percent, U is 17 base mol percent, V is 13 base mol percent, W is 16 base mol percent and Z is 0 base mol percent. The average degree of polymerization (viscosity average) is $\overline{P} = 20$. From this data there is obtained an equivalent weight of the POC Na salt of 109.0 (with consideration of the degree of neutralization of 0.88 as exists at a pH of 7 having regard to the analytically determinable end groups).

The other POC, Type B, used in the composition of the invention is characterized by the following data.

A poly(aldehydocarboxylic acid) solution was produced by oxidative copolymerization of 50 mol percent of acrylic acid with 50 mole percent of acrolein in aqueous 20 weight percent hydrogen peroxide at 70°C (1.1 mol of acroleic per mol of $H_2O_2$ feeding of the monomer mixture to the stirred hydrogen peroxide within 4 hours). This solution was neutralized by adding 45 weight percent sodium hydroxide solution at 35°C after distillative separation of the greatest part of the residual monomers and the neutralized mixture subjected to the Cannizzaro reaction by further addition of NaOH up to pH 12. After neutralization of the alkaline reaction mixture with a residue of the above given poly(aldehydrocarboxylic acid) to pH 7 there was obtained a 38 weight percent aqueous solution of a poly (hydroxycarboxylates) which is described by the following parameters:

Y is 78 base mol percent.
U is 16 base mol percent.
V is 6 base mol percent.
W is 15 base mol percent.
Z is 0 base mol percent.

The average degree of polymerization (viscosity average) is $\overline{P} = 60$. From this data there is obtained an equivalent weight of the POC Na salt of 101.5 (with consideration of the degree of neutralization of 0.88 as exists at a pH of 7 having regard to the analytically determinable end groups). The same formula units for the letters Y, U, V, W and Z are valid as are described with Type A.

The portion of carrier (component B) in the total mixture is 30 to 60 (or even up to 70)weight percent, preferably 40 to 50 weight percent, and the portion of added water is 20 to 50 weight percent, preferably 35 to 45 weight percent.

Advantageously the proportions in the total mixture are as follows.

| | |
|---|---|
| Component A | = 10 weight percent. |
| Component B | = 41 weight percent. |
| Components C and/or D | = 8 weight percent. |
| Component E | = 41 weight percent. |

Components C and D preferably are each 4 weight percent. In the total composition Component A is usually 5 to 15 percent and C and D together are usually 6 to 12 percent.

The anticaking agent has a pH of 7 to 9, preferably 7 to 8.

The anticaking agent is prepared in the following manner. First the carrier (Component B) in suitable proportions is dry mixed with the active materials in an intensive mixer at room temperature and sufficient water is added to this mixture that the active components go into solution and as such is drawn into the carrier, then a pH value of 7 to 9, preferably 7 to 8 is established, or the carrier (Component B), in a given case in admixture with Component C is present and then a solution of the remaining components mixed into the total amount of water and a pH value of 7 to 9, preferably 7 to 8 established.

Unless otherwise indicated all parts and percentages are by weight.

Production of the anticaking agents according to the invention is further explained in the following examples.

EXAMPLE 1

There were mixed in an intensive mixer with a useful volume of 150 liters 25.0 kg of K (wet precipitated silica), 6.5 kg of $K_4Fe(CN)_6 \cdot 3H_2O$ in powder form and 5.0 kg of stearic acid powder for 5 minutes and then there were added 25 liters of water within a further 5 minutes and the composition then further mixed for 10 minutes. There was obtained thereby 61.5 kg of a powdery, readily flowable anticaking agent with an apparent density (bulk density) of about 600 grams/1 which was storage stable and not lumpy.

EXAMPLE 2

There was present in an intensive mixer with a useful volume of 150 liters 25.0 kg of K (wet precipitated silica) and there were added within 5 minutes into the running mixer a solution of 6.5 kg of $K_4Fe(CN)_6 \cdot 3H_2O$ and 5.0 kg POC, Type B, in 25 liters of water. Then mixing was carried out for a further 10 minutes and the powdery readily flowable anticaking agent obtained.

EXAMPLE 3

There were present in an intensive mixer with a useful volume of 150 liters 25.0 kg of K(wet precipitated silica) and 2.5 kg of stearic acid powder and there were added within 5 minutes in 5 portions in the running mixer a solution of 6.5 kg of $Na_4Fe(CN)_6 \cdot 10H_2O$ and 2.5 kg POC, Type B, in 25 liters of water. Then thorough mixing was carried out for a further 10 minutes and the powdery readily flowable anticaking agent discharged.

The anticaking agent of the invention is especially suited for prevention of caking and obtaining flowability of inorganic salts, especially alkali chlorides, e.g. sodium chloride and potassium chloride, and alkali chloride containing industrial salt mixtures, for example fertilizer salts.

The composition can comprise consist essentially of or consist of the stated materials and the process can comprise, consist essentially of or consist of the steps set forth.

What is claimed is:

1. An anticaking agent in the form of a powdery mixture suitable for use to prevent caking of inorganic salts and comprising (A) a complex iron cyanide, (B) a water insoluble inorganic, inert, finely divided hydroxyl group containing material, or a material which forms this in the production of the anticaking agent, at least one active material from (C) and (D) where (C) is a hydrophobizing material and (D) is a hydrophilizing material, said materials (A), (C) and (D) being present on B together with (E) water in an amount of 20 to 50 weight percent of the total powdery mixture.

2. An anticaking agent according to claim 1 wherein the water is 35 to 45 weight percent.

3. An anticaking agent according to claim 1 wherein (A) is an alkali hexacyanoferrate or alkaline earth hexacyanoferrate.

4. An anticaking agent according to claim 3 wherein (A) is sodium, potassium or calcium ferrocyanide.

5. An anticaking agent according to claim 3 wherein (B) is a finely divided precipitated or pyrogenically formed metal oxide or metalloid oxide.

6. An anticaking agent according to claim 3 wherein (B) is $Al_2O_3$ or $SiO_2$ or a mixture of at least two of these oxides in the form of individual oxides, mixed oxides, oxide mixtures or mechanical mixtures of these oxides.

7. An anticaking agent according to claim 3 wherein (B) is at least one silicate which is an alkali, alkali metal or alumino silicate.

8. An anticaking agent according to claim 3 where (B) is $Al_2O_3$, $SiO_2$, alkali silicate, alkaline earth silicate or aluminosilicate or a mixture of at least two of these oxides and silicates wherein said finely divided oxides or silicates have a secondary particle size of 0.1 to 150$\mu$m and a specific surface area measured by BET of 50 to 500 $m^2/g$ an adsorbed moisture in the range of 3 to 6% $H_2O$ and a silanol group density between 1 and 10 $SiOH/100$ $A^2$.

9. An anticaking agent according to claim 8 wherein (B) has a secondary particle size of 0.2 to 20$\mu$m, a specific surface area between 180 and 230 $m^2/g$, an adsorbed moisture in the range of 3 to 6 weight percent and a silanol group density between 3 to 6 $SiOH/100$ A.

10. An anticaking agent according to claim 3 including (C) and where (C) is an organosilicon compound, a polymerized wax or a higher fatty acid.

11. An anticaking agent according to claim 10 wherein (C) is propyltrialkoxysilane, polypropylsiloxane, methylsiloxane, polywax or stearic acid.

12. An anticaking agent according to claim 3 including (D) and where (D) is a polycarboxylate or polyhydric alcohol.

13. An anticaking agent according to claim 12 wherein (D) is a polycarboxylate, glycerine or a polyethylene glycol.

14. An anticaking agent according to claim 12 wherein (D) is (1) a polyacrylate (2) poly(alpha-hydroxyacrylate), (3) maleic acid homo or copolymer, (4) itaconic acid homo or copolymer or (5) a salt of (1), (2), (3) or (4).

15. An anticaking agent according to claim 12 wherein (D) is a polycarboxylate containing a predominant amount of carboxylic acid or carboxylate group and also containing carbonyl groups, hydroxyl groups or a mixture of carbonyl and hydroxyl groups and which polycarboxylate has an average degree of polymerization between 5 and 500.

16. An anticaking agent according to claim 15 wherein the degree of polymerization is between 10 and 300.

17. An anticaking agent according to claim 16 where (D) is a poly(aldehydocarboxylic acid) prepared by oxidizing a copolymer of acrylic acid and acrolein.

18. An anticaking agent according to claim 17 wherein (D) has a degree of polymerization of between 15 and 100.

19. An anticaking agent according to claim 18 containing 10% (A), 41%(B), 4%(D) and 41%(E).

20. An anticaking agent according to claim 15 wherein (D) is a polymer composed predominantly of two repeating units having the formulae:

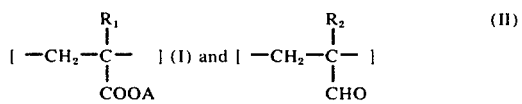

or units having the Formulae I and II together with minor amounts of repeating units having the formulae:

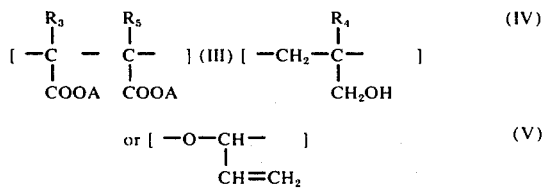

where A is hydrogen, alkali metal or the ammonium ion, R is hydrogen, methyl, hydroxymethyl, ethyl, chlorine or bromine, $R_2$ is hydrogen or hydroxymethyl, $R_4$ is hydrogen or hydroxymethyl, $R_3$ is hydrogen, methyl or ethyl and $R_5$ is hydrogen, methyl or ethyl.

21. An anticaking agent according to claim 20 where (B) is 30 to 60 percent.

22. An anticaking agent according to claim 21 wherein the total of (A), (C) and (D) is at least 15 percent.

23. An anticaking agent according to claim 3 wherein the total of (A), (C) and (D) is at least 15 percent.

24. An anticaking agent according to claim 23 wherein the total of (A), (C) and (D) is at least 5 percent and (B) is 30 to 60 percent.

25. An anticaking agent according to claim 24 wherein (B) is 40 to 50 percent and (E) is 35 to 45 percent.

26. An anticaking agent according to claim 3 wherein (B) is 30 to 70 percent.

27. An anticaking agent according to claim 3 having a pH of 7 to 9.

28. An anticaking agent according to claim 27 having a pH of 7 to 8.

* * * * *